March 1, 1932. R. S. WENTWORTH 1,847,319
RIM AND DRUM COOLING MEANS FOR VEHICLE WHEELS
Filed Dec. 28, 1926
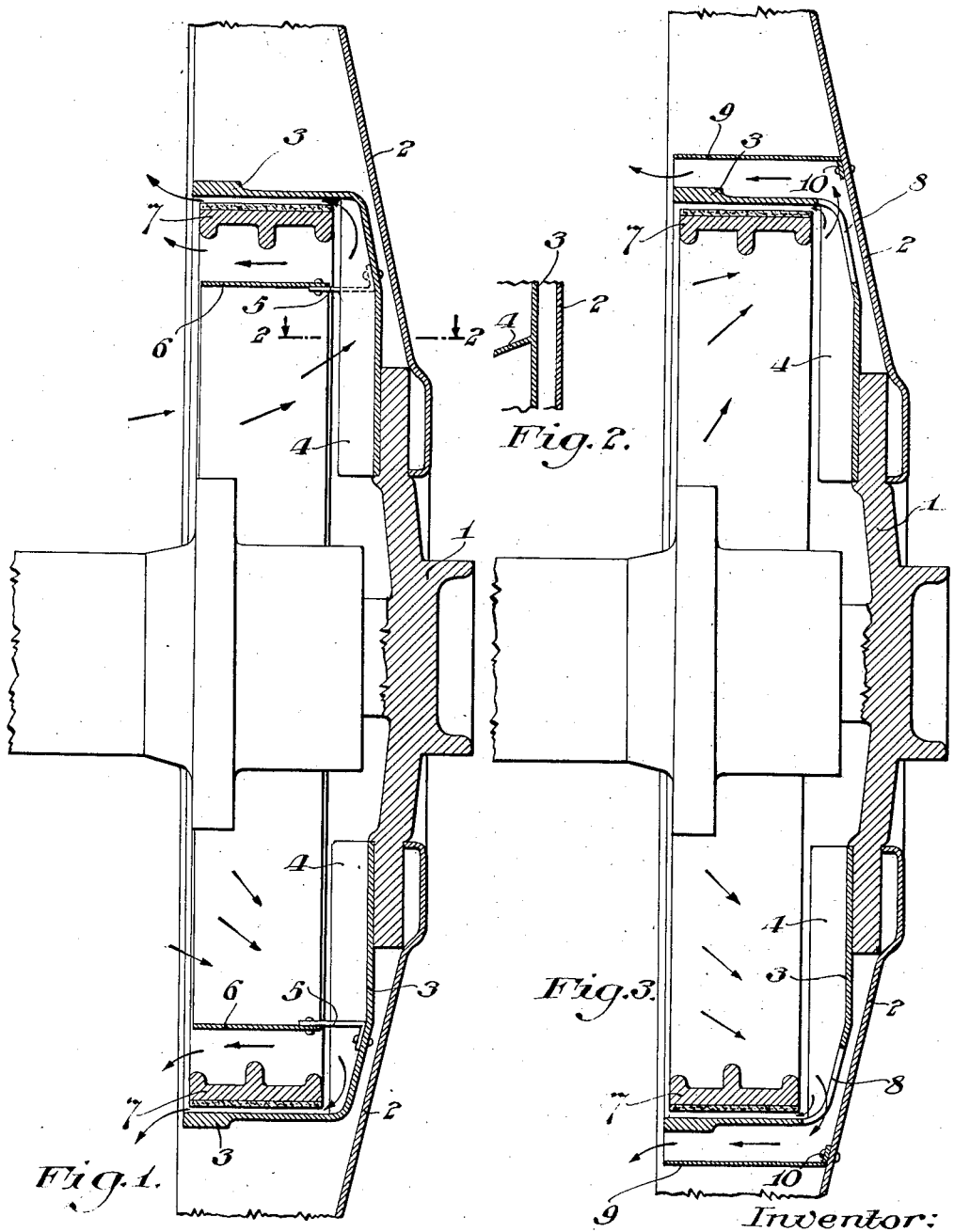
Inventor:
Robert S. Wentworth,
By John I. Jarbox
Attorney.

Patented Mar. 1, 1932

1,847,319

UNITED STATES PATENT OFFICE

ROBERT S. WENTWORTH, OF GERMANTOWN, PENNSYLVANIA, ASSIGNOR TO BUDD WHEEL COMPANY, OF PHILADELPHIA, PENNSYLVANIA, A CORPORATION OF PENNSYLVANIA

RIM AND DRUM COOLING MEANS FOR VEHICLE WHEELS

Application filed December 28, 1926. Serial No. 157,510.

This invention relates to a tire rim and brake drum cooling device for vehicle wheels.

Ordinarily, the heat generated in the brake drums of vehicle wheels during operation of the brakes is radiated or conducted to the tire rim. The tire rims because of this fact have their normal running temperatures greatly increased, resulting in the production of a deleterious effect upon the tires and a much diminished period of service therefor. Especially, has this disadvantage been apparent and acute in the case of trucks, busses, and other motor vehicles of the heavy duty type, although, it is also true to a lesser degree as regards the pleasure car.

The main object of this invention is to provide means readily adapted for use upon wheels of various types for eliminating the production of heat in the tire rim by the brake drum.

Other objects and advantages will become apparent from time to time as the description of the invention progresses.

In carrying the invention into effect and attaining the objects thereof, it is contemplated to prevent the raise in temperature of the tire rim by the heat generated in the brake drum during the braking operation, by directing cooling and dissipating currents of air across and within the drum, thereby obviating to a large degree the source of the heat supply.

In order to present a clear description of the invention, actual embodiments thereof are disclosed in the accompanying drawings, wherein, Fig. 1 is a vertical section through a vehicle wheel, showing one of the many forms which the invention may take, Fig. 2 is a sectional view taken on line 2—2 of Fig. 1, and Fig. 3 is a vertical section through a vehicle wheel, showing another form which the invention may take.

At the outset it should be thoroughly understood, that the invention may be applied to any type of wheel, the particular wheel shown and described herein not being intended as a limitation upon the application of the invention.

The invention is shown in Fig. 1 as applied to a disc wheel carried by a live axle having a hub plate or disc 1, wheel disc 2, and brake drum 3. These wheel elements are merely designated generally, the structure being purely illustrative and perfectly apparent. Attention is directed to the fact, that for purposes of showing on a larger scale the material features of the invention, the outer periphery of the wheel including the tire rim and tire have been omitted.

A number of radially inclined vanes 4 may be attached to or formed integral with the inner vertical wall of the brake drum, as shown in Figures 1 and 2. The number of these vanes will vary according to the conditions to be overcome. The function of these vanes is probably now fully apparent but the same will be more fully brought out later.

A number of angle brackets 5 are riveted or otherwise secured to the inner surface of the vertical wall of the drum in spaced circular relation although these brackets could be struck from, or integrally formed with, the drum. Attached to the inner ends of these brackets is a metallic band or baffle 6 arranged in concentric relation to the brake drum and of substantially the same width. This concentric baffle or band may be riveted, welded or otherwise secured to the brackets 5, or it may be integrally formed therewith.

The brake shoes 7 are shown separated from the drum, as during non operation of the brakes, the separation being somewhat exaggerated for purposes of clear illustration.

The foregoing description is thought to have clearly demonstrated, that during the revolution of the wheel the vanes 4 cause a circulation of air to be set up within the drum, as shown by the arrows in Fig. 1. The baffle 6 divides this air circulation into an intake and outlet circuit. The air is drawn into the drum near the hub beneath the baffle and is discharged out of the drum by centrifugal force above the baffle, and also between the brake shoes and drum. The heat generated in the drum by the braking operation will be diminished and radiated away by the cooling air currents passing over the drum. Further, the main air currents, as well as the lesser eddy air currents within the drum, will tend to reduce and minimize the heat carried by conduction through the drum, hub and disc to the tire rim and tire.

The form of the invention shown in Fig. 3 is different from that described, in structure only, the result effected being the same. The wheel in this form is the same as that shown for Fig. 1, and the various elements thereof are designated by the same reference numerals. The radial vanes are also the same in both forms and may be designated by the same numeral, as may also the brake shoes.

However, in this modification, the brake drum is provided with a number of openings 8 around its inner (with respect to the wheel) peripheral edge in the angle between the vertical and horizontal portions, the number thereof varying according to conditions.

A circular baffle or band 9 having a downturnd flange 10, is secured by such flange, to the inner side of the wheel disc 2 between the brake drum and tire rim.

The operation of this form is as follows:
The wheel being in motion, the vanes cause an inward current of air within the drum and upwardly through the apertures 8. This air current then passes outwardly between the baffle 9 and drum 3. There is also an induced inward current of air between the brake shoes 7 and the brake drum 3, as shown by the arrows in Fig. 3. The currents of air thus produced cool the vertical wall of the brake drum, the brake shoes, the braking surface of the drum and the wheel disc. In this manner the heat is prevented from reaching the tire rim and tire by either conduction or radiation.

The braking mechanism, aside from the sectional showing of the brake shoes, has not been disclosed, since any form may be used, and the same is not an essential part of the invention.

The modern tendency to use metal brake shoes, or brake shoes covering only a small portion of the drum, further increases the efficacy of the invention.

It should be apparent from the preceding description, that means, constructed in accordance with the invention, effectively eliminates at the source the heat carried to the tire rim and tire by radiation or conduction from the brake drum, and in so doing greatly increases the life of tires, particularly those used upon metal wheels.

Not wishing to limit the application of the invention to the forms shown herein, the following claims are appended so that the invention will extend to every embodiment within the scope of such claims.

I claim:

1. A brake drum cooling device for vehicle wheels comprising a plurality of inclined radial vanes arranged in spaced circular relationship within the drum adapted to cause a circulation of air therein, and means for directing said circulation of air outwardly of the drum across the surface of the braking portion thereof, throughout the greater portion of its circumference.

2. A brake drum cooling device for vehicle wheels comprising means arranged within the drum for causing a circulation of air therein, and a circular band arranged in spaced concentric relationship with said drum for directing said circulation of air outwardly thereof in the space between the same and the band.

3. A brake drum cooling device comprising circularly spaced inclined radial vanes arranged within the drum adapted to cause a circulation of air therein, and a circular band arranged in spaced concentric relationship with said drum for directing said circulation of air outwardly thereof in the space between the same and the band.

4. A brake drum cooling device for vehicle wheels comprising a plurality of radial inclined vanes attached to the inner vertical surface of the drum in spaced circular relationship, and a circular band also attached to the inner vertical surface of the drum in spaced concentric relationship with the braking portion thereof, whereby air currents are drawn into the drum near the center thereof and expelled therefrom by centrifugal force between the said band and the braking portion thereof.

5. A brake drum cooling device for vehicle wheels comprising a plurality of radial inclined vanes arranged upon the inner vertical surface of the drum in spaced circular relationship, a plurality of spaced angular brackets arranged between the vanes on the said inner surface, and a circular band concentrically spaced from the braking portion of the drum attached to said brackets, whereby air is drawn into the central part of the drum and expelled adjacent the inner periphery of the braking portion thereof.

In testimony whereof he hereunto affixes his signature.

ROBERT S. WENTWORTH.